(12) United States Patent
Mentz et al.

(10) Patent No.: US 9,455,879 B1
(45) Date of Patent: Sep. 27, 2016

(54) VALIDATING CHANGES TO ATTRIBUTES FOR COMPUTING RESOURCES

(71) Applicant: Amazon Technologies, Inc., Reno, NV (US)

(72) Inventors: Joshua Mentz, Cape Town (ZA); Willem Jacob Buys, Cape Town (ZA); Ronen Dov Agranat, Cape Town (ZA); Timothy Ralph Sjoberg, Cape Town (ZA); Gregory Jonathan Kempe, Cape Town (ZA); Malcolm Featonby, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 449 days.

(21) Appl. No.: 13/784,454

(22) Filed: Mar. 4, 2013

(51) Int. Cl.
G06F 15/16 (2006.01)
H04L 12/24 (2006.01)
H04L 29/06 (2006.01)

(52) U.S. Cl.
CPC ........... *H04L 41/30* (2013.01); *H04L 65/1073* (2013.01)

(58) Field of Classification Search
None
See application file for complete search history.

(56) References Cited

U.S. PATENT DOCUMENTS

| | | | |
|---|---|---|---|
| 6,397,346 B1 | 5/2002 | Cavanaugh et al. | |
| 7,328,210 B2 * | 2/2008 | Barchi et al. | |
| 7,711,953 B2 | 5/2010 | Ali et al. | |
| 2007/0038856 A1 * | 2/2007 | Ali | G06F 21/57 713/164 |
| 2011/0116789 A1 * | 5/2011 | Wellbrock et al. | 398/5 |
| 2012/0173688 A1 * | 7/2012 | True et al. | 709/223 |
| 2013/0205364 A1 * | 8/2013 | Kiehtreiber | H04L 63/20 726/1 |

OTHER PUBLICATIONS

Adya et al., "Thialfi: A Client Notification Service for Internet-Scale Applications," Proc. 23rd ACM Symposium on Operating Systems Principles (SOSP), pp. 129-142 (Oct. 2011).
Amazon, "Amazon Simple Notification Service (Amazon SNS)," <http://aws.amazon.com/sns/>, 9 pages (accessed Feb. 14, 2013).

* cited by examiner

*Primary Examiner* — Hamza Algibhah
(74) *Attorney, Agent, or Firm* — Klarquist Sparkman, LLP

(57) ABSTRACT

Requests to change attributes of servers or other computing resources can be validated by a veto service. For example, the veto service can receive requests to register for notification of changes to an attribute for a server, send a notification of a pending change to the attribute to each of a plurality of services, determine a response to the notification for each service, and based on the responses decide whether to allow or deny the pending change to the attribute. The responses from the notified services can be received responses or default responses.

22 Claims, 6 Drawing Sheets

VALIDATING CHANGES TO ATTRIBUTES FOR COMPUTING RESOURCES

BACKGROUND

In a computing environment with many computing devices, such as a virtual server or cloud computing environment with many computer servers, managing such computing devices can be a difficult task. For example, an administrator may need to make changes to a number of computer servers, such as to take them offline for maintenance. However, making such changes to the servers can have a negative impact if the servers are actively being used to provide computing resources to customers. For example, if the administrator is not aware that the servers are actively being used by customers, then taking the servers offline for maintenance can disrupt the customers' use of the servers. Similarly, the administrator may not be aware of the impact of making the change on other systems and services of the computing environment.

Some solutions have been implemented for providing notification of changes to servers. For example, a customer can be notified when a server is going offline. However, such solutions may not provide an automated method of notification and approval. Furthermore, such solutions may not operate correctly when the notification recipient is not reachable.

Therefore, there exists ample opportunity for improvement in technologies related to validating changes to servers.

DETAILED DESCRIPTION

Overview

Figure 1:
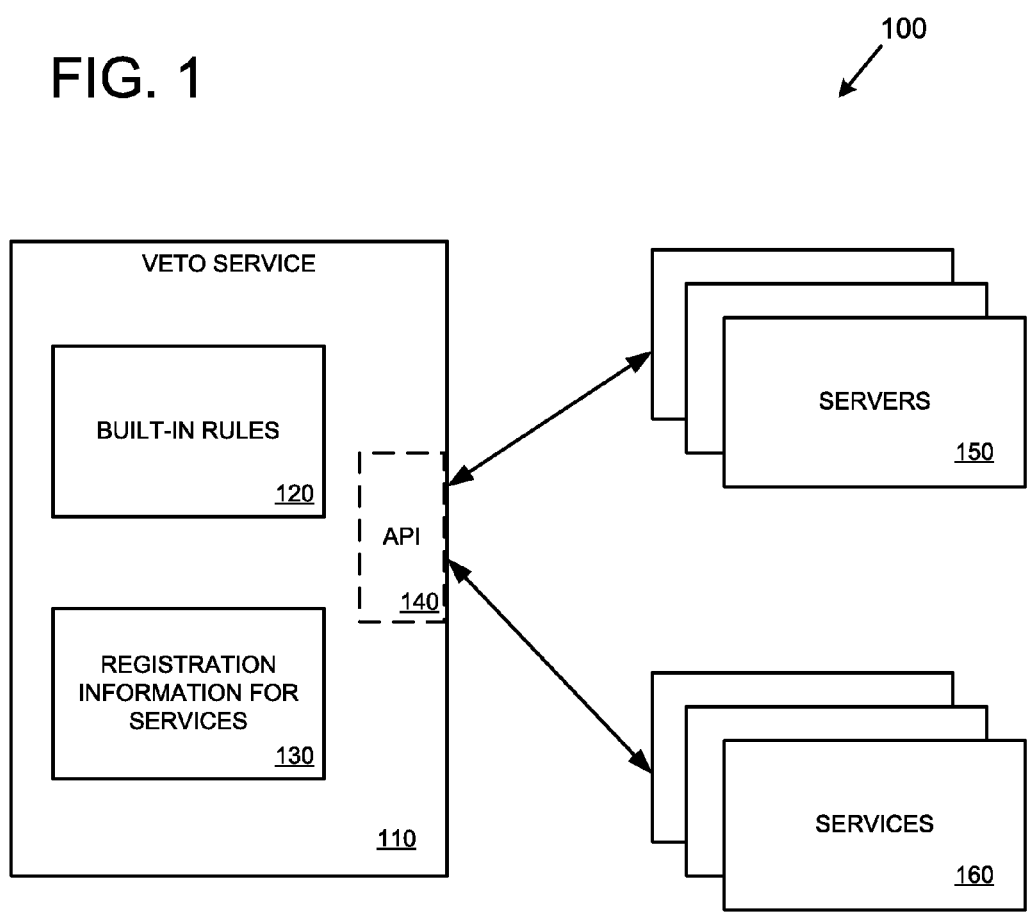
FIG. 1 is a block diagram of an example environment for validating changes to attributes.

The following description is directed to techniques and solutions for validating requests to change attributes of servers and/or other computing resources (e.g., database services, networking equipment, and other types of computing resources). For example, the validation can be performed by a veto service. The veto service can provide a registration facility where services can register to be notified of changes to attributes of computing resources. When a change to an attribute is pending, services that have registered to be notified can be notified by the veto service. The veto service can then decide whether to allow or deny the pending change based on responses from the notified services (e.g., received and/or default responses).

Changes to attributes of servers and/or other computing resources can be initiated by a person, such as an administrator or engineer. Changes to attributes of servers and/or other computing resources can also be initiated by a computing resource, such as an automated process. Regardless of the source of the requests, the requests can be sent to a veto service to be validated to determine whether to allow or deny the requests.

A veto service can determine whether to allow or deny a pending change to an attribute of a computing resource based on responses from services. For example, if any service vetoes the pending change, then the change can be denied. If all services allow the pending change, then the veto service can allow the change (e.g., initiate the change or notify another system or service to perform the change).

Alternatively, instead of allowing any service to veto a pending change, the notified services can vote on the change. For example, if a majority of the services allow the change, then the change can be initiated (e.g., even though less than a majority of the services voted to deny, or veto, the change). Weighting can also be applied to voting. For example, votes from some services can be weighted higher than votes from other services (e.g., when determining whether a majority or threshold has been reached to allow a change). Voting can also be applied in combination with a veto solution (e.g., by allowing some services to veto and requiring other services to vote).

A veto service can consider information other than responses from services when deciding whether to allow or deny pending changes to attributes of computing resources. For example, the veto service can consult a set of rules (e.g., internal rules associated with the veto service). The rules can specify, for example, specific requirements that changes must meet in order to be allowed. For example, a rule can specify that servers must be rebuilt before transitioning from a testing state to a production state. A veto service can consult such rules as part of deciding whether to allow or deny a pending change. For example, evaluation of such rules can result in a decision allowing or vetoing the change. If any of the rules evaluated for a particular change to an attribute result in a veto, then the pending change can be denied (e.g., even if all notified services would allow the change). Therefore, responses from rules can be considered along with responses (e.g., received or default responses) from notified services.

As an example, consider an engineer who wants to rebuild an occupied server that is actively running one or more customer instances. For example, the engineer could use a graphical user interface for managing server resources and select a rebuild button to initiate a rebuild of the occupied server. Initiating the rebuild could send a request to a veto service to change the state of the occupied server from a production state to a rebuild state. The veto service would then send a request to all services that have registered to be notified of such a change to the occupied server. The veto service could also check one or more internal rules. Based on responses from the notified services and/or internal rules, the veto service would then decide whether to allow or deny the pending change to the occupied server (e.g., a notified service and/or internal rule could veto the change because the server is currently occupied).

A veto service can also apply a filter to responses from services when deciding whether to allow or deny pending changes to attributes of computing resources. The filter can consider the responses from the services (e.g., received and/or default responses) and influence the decision (e.g., generate filtered responses, which may alter some of the allow/veto responses from the services). For example, a filter can be applied that groups services into two or more categories (e.g., a first-class group and a second-class group)

and processes responses differently based on the group. For example, responses from services in a first-class group can be treated normally (e.g., a veto from any service in the first-class group can result in the request being denied) while responses from a second-class group can be treated differently (e.g., a certain number of services, such as a majority or threshold number, in the second-class group may be required to veto before the veto will count, otherwise the veto will not be considered when making the decision to allow or deny the request). As another example, a filter can consider other factors, such as a capacity threshold. For example, different capacity thresholds can be set (e.g., a threshold that represents a minimum amount of capacity for a particular capacity type, such as production server capacity). Taking the production server capacity threshold example, a filter can prevent a change that would reduce capacity below the threshold (e.g., where notified services would have allowed the change). As another example, a filter can consider time deferred responses (e.g., where a particular service indicates that it cannot respond immediately, but should be able to respond within a particular amount of time). In this example, the filter can defer the pending change to wait for a response, use a default response instead of deferring the pending change, or take some other action.

For example, the solutions described herein provide advantages by notifying services and/or other interested parties that the administrator or computing service may not be aware of, or may not consider, when initiating the change. The notified services and/or other interested parties then have the opportunity to veto the pending change. This solution also provides advantages by evaluating internal rules before allowing the pending change. These notifications and checks can reduce or eliminate disruptive changes to the computing resources of a computing environment.

Attributes for Servers

In any of the embodiments described herein, attributes are aspects of servers (or other computing resources) that can be changed. For example, attributes of a single server, or a group of servers, can be changed from one state to another. Attributes can also indicate aspects of other types of computing resources, such as computing devices (e.g., networking equipment) and computing services (e.g., database services). Therefore, the various techniques and solutions that are described herein with regard to servers can also be applied to other types of computing resources.

An example attribute of a server is an operating state of the server. The operating state attribute indicates whether the server is operating, for example, in a production mode, a testing mode, a maintenance mode, a rebuild mode, and/or another type of operating mode.

Another example attribute of a server is a usage class of the server. The usage class attribute indicates how the server is being used. For example, the usage class can indicate whether the server is designated as production capacity, spare capacity, isolated, or maintenance.

Another example attribute of a server is the operating system installed on the server. The operating system attribute can indicate, for example, that a server is running a Linux operating system (e.g., a particular version of Linux) or a Windows (Windows is a registered trademark of Microsoft Corporation) operating system (e.g., a particular version of Windows).

Attributes can indicate aspects (e.g., status, category of usage, etc.) of servers as well as other computing resources (e.g., database systems, networking equipment, and other types of computing resources).

Changes to Attributes

In any of the embodiments described herein, attributes can be changed from one value to another (e.g., from one state to another state). For example, a change to an attribute can represent a transition of the attribute from a first state to a second state. For example, an operating state attribute for a group of servers can be changed (e.g., transitioned) from a first state (e.g., representing a production state for the group of servers) to a second state (e.g., representing a testing state for the group of servers).

Changes to attributes can be initiated in various ways. For example, changes to attributes for a server, or group of servers, can be initiated by a person (e.g., an administrator or engineer managing a group of servers in a virtual server environment). For example, an engineer can initiate a change to transition a group of servers from a test operating state to a rebuild operating state. Changes to attributes for a server, or group of servers, can also be initiated by a service (e.g., an automated process). For example, a capacity management service (e.g., a computing service that manages capacity for a cloud computing environment) can initiate a change for transitioning a group of servers from a spare capacity state to a production capacity state.

Registering for Notifications

In any of the embodiments described herein, services and/or other interested parties can register to be notified of changes to attributes associated with servers and/or other computing resources. Registration requests can be received, for example, by a veto service. The veto service can receive the requests from one or more services, store the requests, notify the registered services of pending changes, determine whether to allow or deny the pending changes, and/or perform the pending changes when the changes are allowed.

Registration can be performed for specific attributes. For example, a service can register to be notified of a change to a specific attribute, such as an operating state attribute. Then, when there is a pending change to the specific attribute (e.g., when there is a pending change to the operating state attribute), the service can be notified. As an example, a service can register to be notified when a server usage attribute associated with one or more servers changes from a production state to a maintenance state.

Registration for notification of changes to attributes can be performed dynamically on an as-needed basis. For example, services and/or other interested parties can register to be notified when new servers and/or other computing resources come online. Services and/or other interested parties can also change their registrations or remove registrations (e.g., deregister) when notification is no longer desired.

Registration can be performed for a group of attributes. For example, a service can register to be notified of a change to a group of specific attributes, such as an operating state attribute and a usage class attribute. Then, when there is a pending change to any attribute in the group, the service can be notified.

Registration can be performed for specific changes to one or more attributes. For example, a service can register to be notified of a transition of one or more attributes to a specific state and/or from a specific state. As an example, a service can register to be notified when an operating state attribute for one or more servers is going to be transitioned from a production state to any other state. As another example, a service can register to be notified when an operating state attribute for one or more servers is going to be transitioned from any state to a maintenance state. As yet another example, a service can register to be notified when an operating state attribute for one or more servers is going to be transitioned from a production state to a testing state. As these examples illustrate, registration to be notified of changes is supported for services on an attribute-by-attribute basis, on a state-by-state basis, and/or on a server-by-server basis.

Registration can include registration of default responses. A default response is a response that is used when the recipient (e.g., a service or other interested party) is non-responsive. A recipient is non-responsive when a response is not received from (or cannot be delivered to) the recipient. For example, a recipient service may be offline or otherwise unreachable (e.g., due to a network failure, software failure, and/or hardware failure). As another example, even if a recipient is reachable (e.g., a notification is delivered to the recipient), a response may still not be received from the recipient (e.g., due to a software problem with the recipient service and/or a network issue). In some implementations, when a response is not received from the recipient within a designated time (e.g., within user-configurable or pre-determined amount of time, such as a number of seconds or minutes), the recipient is designated as non-responsive.

Registration of default responses can be performed for specific attributes, groups of attributes, and/or for specific changes to one or more attributes. For example, a service can designate a default response to allow all changes to an attribute (or a set of attributes) for a server (or a group of servers). As another example, a service can designate a default response to veto all changes to an attribute (or set of attributes) for a server (or a group of servers). As yet another example, a service can designate a default response that includes an instruction to allow some changes while vetoing others (e.g., to allow changes to an operating state attribute when transitioning from a production state to a testing state, but to veto changes to the operating state attribute when transitioning from a testing state to a production state). As yet another example, a service can designate a default response that is a deferral to another service (e.g., if a particular service is non-responsive, then use another service's response instead). As these examples illustrate, registration of default responses to changes is supported for services on an attribute-by-attribute basis, on a state-by-state basis, and/or on a server-by-server basis.

In some implementations, other interested parties can register to be notified of pending changes to attributes, and have the ability to allow or veto the change (e.g., in combination with responses received from services). For example, people (e.g., administrators or engineers, customers, etc.) can register to be notified. When people are allowed to register, the notification system may no longer be automated because a person may not respond quickly. If quick responses are desired, then the veto service can require that responses be received within a specific amount of time (e.g., a number of seconds, minutes, or hours) in order to be considered when deciding whether to allow or deny a pending change. In other implementations, people cannot register for notification of changes to attributes (e.g., only automated processes, such as computing services, can register to maintain real-time or near-real-time operation).

Sending Notifications

In any of the embodiments described herein, notifications can be sent to services and/or other interested parties that have registered. Notifications can be sent when there is a pending change to one or more attributes for one or more servers and/or other computing resources. Notifications can be sent to those services that have registered to receive notification of the particular attribute (or attributes), for the particular transition (or transitions), and/or for the particular server (or servers) and/or other computing resources.

For example, a service can register to receive notification before the operating state of a particular server is changed from a production state to a testing state. When there is a pending change to the particular server to transition from a production state to a testing state, the service can be notified. The service can then provide a response indicating that the service will allow the transition or that the service will veto the transition.

Veto Service

In any of the embodiments described herein, a veto service can be provided to manage changes to attributes of servers and/or other computing resources. The veto service can be any type of service (e.g., any type of computing service) running on one or more computing devices (e.g., as part of a distributed service for managing changes to attributes within a virtual server or cloud computing environment). The veto service can perform operations for validating (e.g., approving or denying) changes to attributes, such as receiving notification requests from services, notifying registered services of pending changes, determining whether to allow or deny the pending changes, and/or performing the pending changes when the changes are allowed.

For example, a veto service can determine that there is a pending change to an attribute for a particular server (e.g., that an engineer has requested that the server's operating state be changed to a maintenance state). In response to the pending change to the attribute, the veto service can send notifications to all services that have registered to be notified of the pending change (e.g., depending on which state the attribute is transitioning from, to, or both). For example, a service could have registered to be notified of any change to the attribute for the particular server or only to specific changes to the attribute (e.g., only from a particular state, only to a particular state, etc.).

The veto service can determine responses from the notified services. For example, the veto service can receive responses from those services that are responsive and determine default responses from those services that are non-responsive. Based on the determined responses from the services, the veto service can decide whether to allow or deny the pending change. For example, if all of the notified services allow the pending change (e.g., either by a received response or a default response), then the pending change can be allowed (e.g., the veto service can initiate the change or notify another service or interested party to carry out the change). If any one of the notified services veto the pending change (e.g., either by received response or a default response), then the pending change can be denied (e.g., the veto service can deny the change or notify another service or interested party to deny the change). The veto service can also notify services and/or other interested parties of results (e.g., whether the pending change was allowed or denied) and/or details of the results (e.g., which service denied the pending change and/or the reason for the denial).

The veto service can also check one or more rules (e.g., internal or built-in rules) when deciding whether to allow or deny a pending change (e.g., alone or in combination with responses from notified services).

Environment for Validating Changes to Attributes

In any of the embodiments described herein, an environment can be provided for validating changes to attributes using, at least in part, a veto service. For example, the environment can be a virtual server environment or a cloud computing environment that provides computing resources to customers.

FIG. 1 is a diagram depicting an example environment 100 for validating changes to attributes. The environment 100 comprises a veto service 110. The veto service 110 validates changes to attributes for servers 150 and/or for other computing resources of the environment 100 (e.g., networking resources, database services, etc.).

The veto service 110 can provide a registration facility for services 160, and other interested parties, to register to receive notifications of changes to attributes for the servers 150. For example, the services 160 can dynamically submit requests to the veto service 110 to register for notification of changes to one or more attributes for one or more of the servers 150 (e.g., to register for all state transitions for one or more servers and/or only specific state transitions for one or more servers). The veto service 110 can store the registration information 130 (e.g., in a storage repository, such as a database). The veto service 110 can also receive registration of default responses from the services 160, and the default responses information can be stored in the registration information 130.

The veto service 110 can determine that there is a pending change to one or more attributes for one or more of the servers 150. For example, the veto service 110 can determine that there is a pending change based on a request from an administrator requesting the change and/or from a service (e.g., an automated process, such as a capacity management service) requesting the change.

The veto service 110 can send a notification of a pending change to each service that has registered to receive a notification. For example, the veto service 110 can check the registration information 130 and determine which of the services 160 have registered to receive notification of a specific pending change. The veto service 110 can then send the notification to only those services that have registered for notification of the specific pending change.

The veto service 110 can determine responses from services that have been notified of a pending change. For example, the veto service 110 can receive responses from services indicating whether to allow or veto the pending change. The veto service 110 can also determine default responses for services that are non-responsive.

The veto service 110 can decide whether to allow or deny the pending change based on the determined responses. For example, when all notified services allow the pending change, the change can be allowed. Conversely, when any one of the notified services vetoes the pending change, the change can be denied. If the change is allowed, the veto service 110 can initiate the change (e.g., perform the change or notify another device, service, or administrator to perform the change).

The veto service 110 can also check one or more built-in rules 120 when deciding whether to allow or deny a pending change. The built-in rules 120 can instruct the veto service 110 to allow or veto pending changes based on the attribute, the transition (e.g., to a specific state or states, from a specific state or states, and/or a transition from a specific state to a specific state), and/or the server. For example, a built-in rule can instruct the veto service 110 to veto requests to change a usage class state from testing to production (e.g., the server may have to transition first to a rebuild state before being placed into production).

In some implementations, the veto service 110 comprises an application programming interface (API) 140. The API 140 is used for communication between the veto service 110 and the services 160 (e.g., to register for notifications, to send/receive notifications and responses, etc.). The API 140 is also used for communication between the veto service 110 and the servers 150.

Validating Changes to Attributes

In any of the embodiments described herein, attribute changes to servers and/or other computing resources can be validated to determine whether to allow or deny the change. Validation can comprise notifying services and/or other interested parties of the change and receiving responses or determining default responses. If any recipient vetoes the change, then the change can be denied. Otherwise, the change can be allowed.

Figure 2:
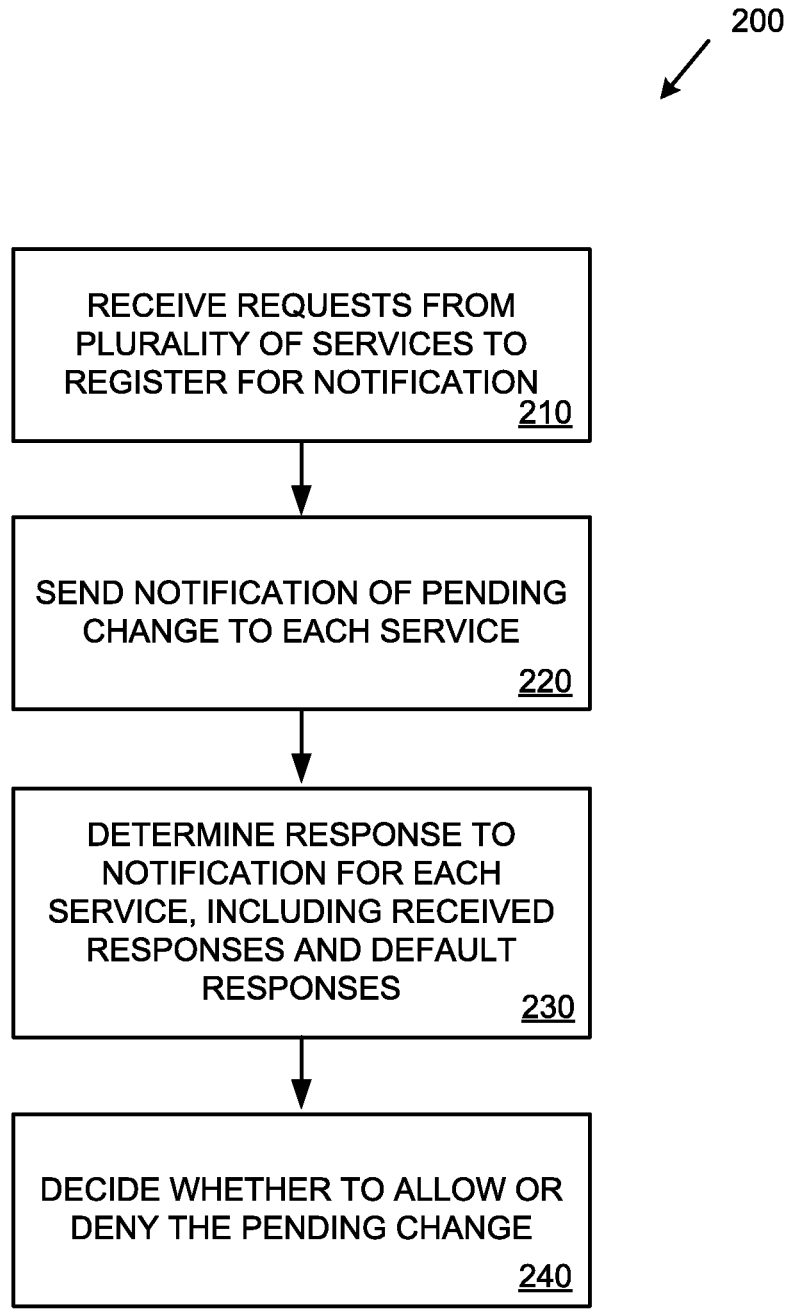
FIG. 2 is a flowchart of an example method for validating requests to change attributes of servers.

FIG. 2 is a flowchart of an example method 200 for validating requests to change attributes of servers and/or other computing resources. The method 200 can be performed, for example, by a veto service, such as veto service 110.

At 210, requests are received from a plurality of services to register for notification of changes to an attribute for a server. For example, a service can register for notification for changes to the attribute to and/or from specific states. A service can also register a default response to be used when the service is non-responsive.

At 220, a notification of a pending change to the attribute for the server is sent to each of the services that registered to be notified at 210. For example, the notification can be sent 220 in response to a veto service receiving a request to change the attribute for the server (e.g., from an administrator or automated process).

At 230, a response to the notification is determined for each of the services. The response is one of an approval and a veto. The response can be received from the service or, if the service is non-responsive, then a default response can be used instead.

At 240, a decision is made to allow or deny the pending change to the attribute for the server. For example, if all notified services allow the change, then the pending change can be allowed. However, if any of the notified services veto the change, then the pending change can be denied.

Figure 3:
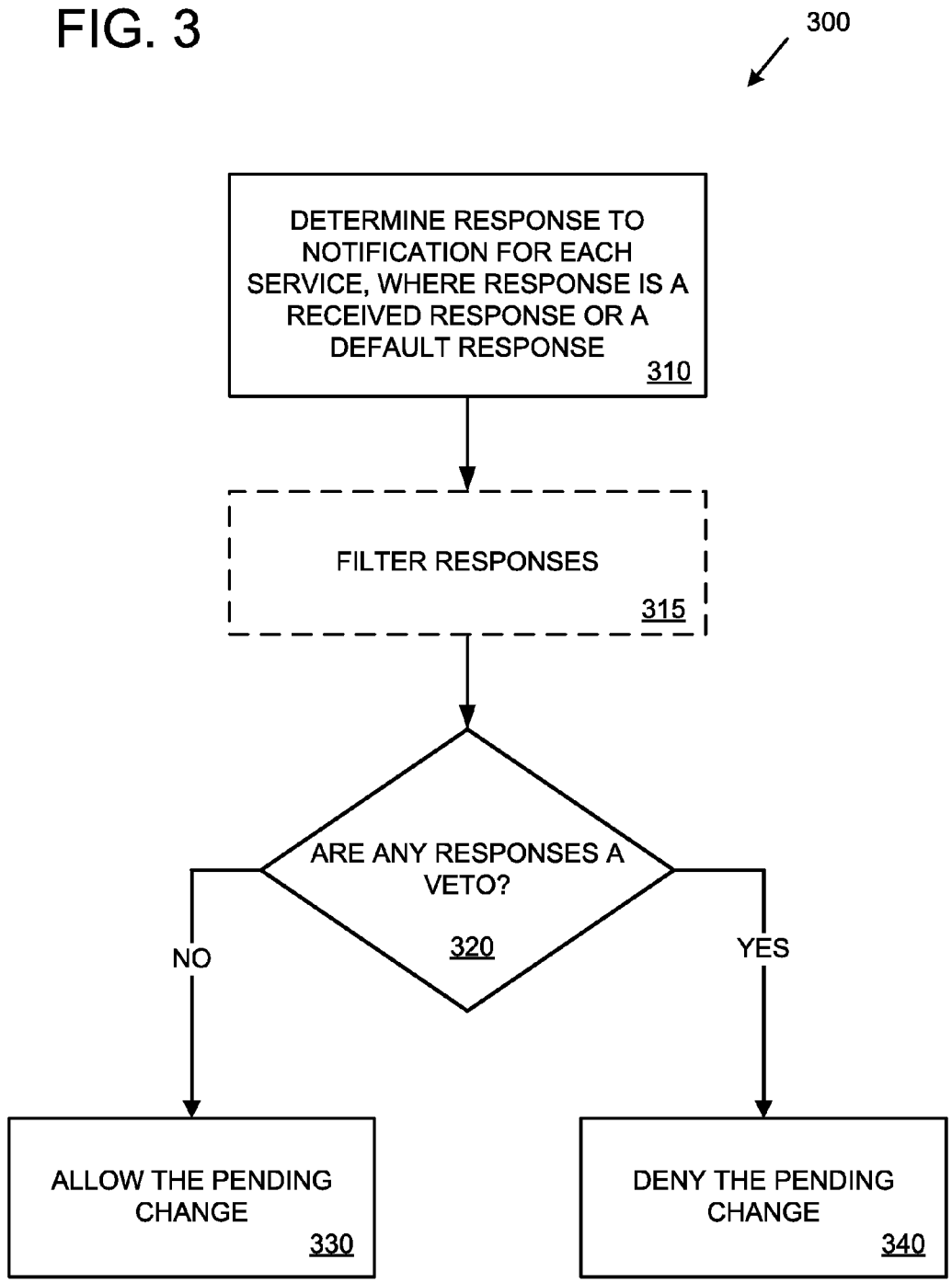
FIG. 3 is a flowchart of an example method for deciding whether to allow or deny pending changes to attributes.

FIG. 3 is a flowchart of an example method 300 for deciding whether to allow or deny pending changes to attributes. The method 300 can be performed, for example, by a veto service, such as veto service 110.

At 310, responses to a notification of a pending change to an attribute are determined for each service. Responses can be received from each notified service or a default response can be used if a service is non-responsive. Each response indicates whether the corresponding service will allow the change or veto the change.

In some implementations, the determined responses are filtered at 315. For, example, a filter can be applied at 315 to evaluate the responses from the services (e.g., received and/or default responses) and influence the decision (e.g., change a response from allowed to vetoed or from vetoed to allowed, require a majority or threshold number of allowed or vetoed responses for the responses to be considered at 320, etc.).

At 320, the responses are evaluated. If any of the notified services veto the request, then the method proceeds to 340 and the pending change is denied. If none of the notified services vetoed the change (e.g., if all notified services allowed the change), then the method proceeds to 330 and the pending change is allowed.

Figure 4:
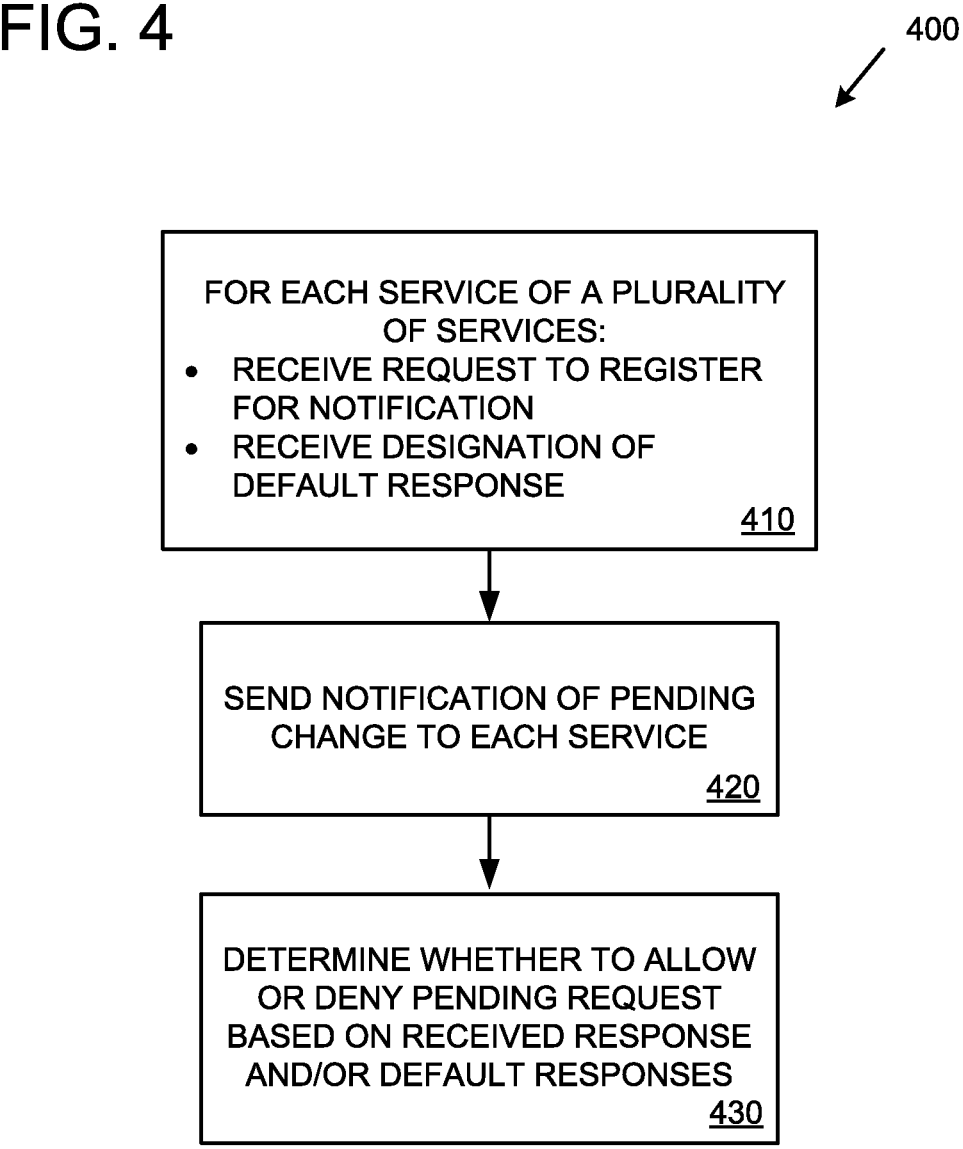
FIG. 4 is a flowchart of an example method for validating requests to change attributes of servers.

FIG. 4 is a flowchart of an example method 400 for validating requests to change attributes of servers and/or other computing resources. The method 400 can be performed, for example, by a veto service, such as veto service 110.

At 410, requests are received from a plurality of services to register for notification of changes to an attribute for one or more servers. The received requests comprise, for each service, a request to register for notification of the change and a designation of a default response to be used when the service is non-responsive.

At 420, a notification of a pending change to the attribute for the one or more servers is sent to each of the services that registered to be notified at 410. For example, the notification can be sent 420 in response to a veto service receiving a request to change the attribute for the one or more servers (e.g., from an administrator or automated process).

At 430, a determination is made whether to allow or deny the pending request based on responses received from services that are responsive and default responses for services that are non-responsive. For example, if any of the responses are to veto the pending request, then the pending request can be denied, and otherwise the pending request can be allowed.

Server Environment Supporting a Veto Service

In any of the embodiments described herein, attribute changes to servers and/or other computing resources can be validated to determine whether to allow or deny the attribute changes. Validation can comprise notifying services and/or other interested parties of the change and receiving responses or determining default responses. If any recipient vetoes the change, then the change can be denied. Otherwise, the change can be allowed.

Figure 5:
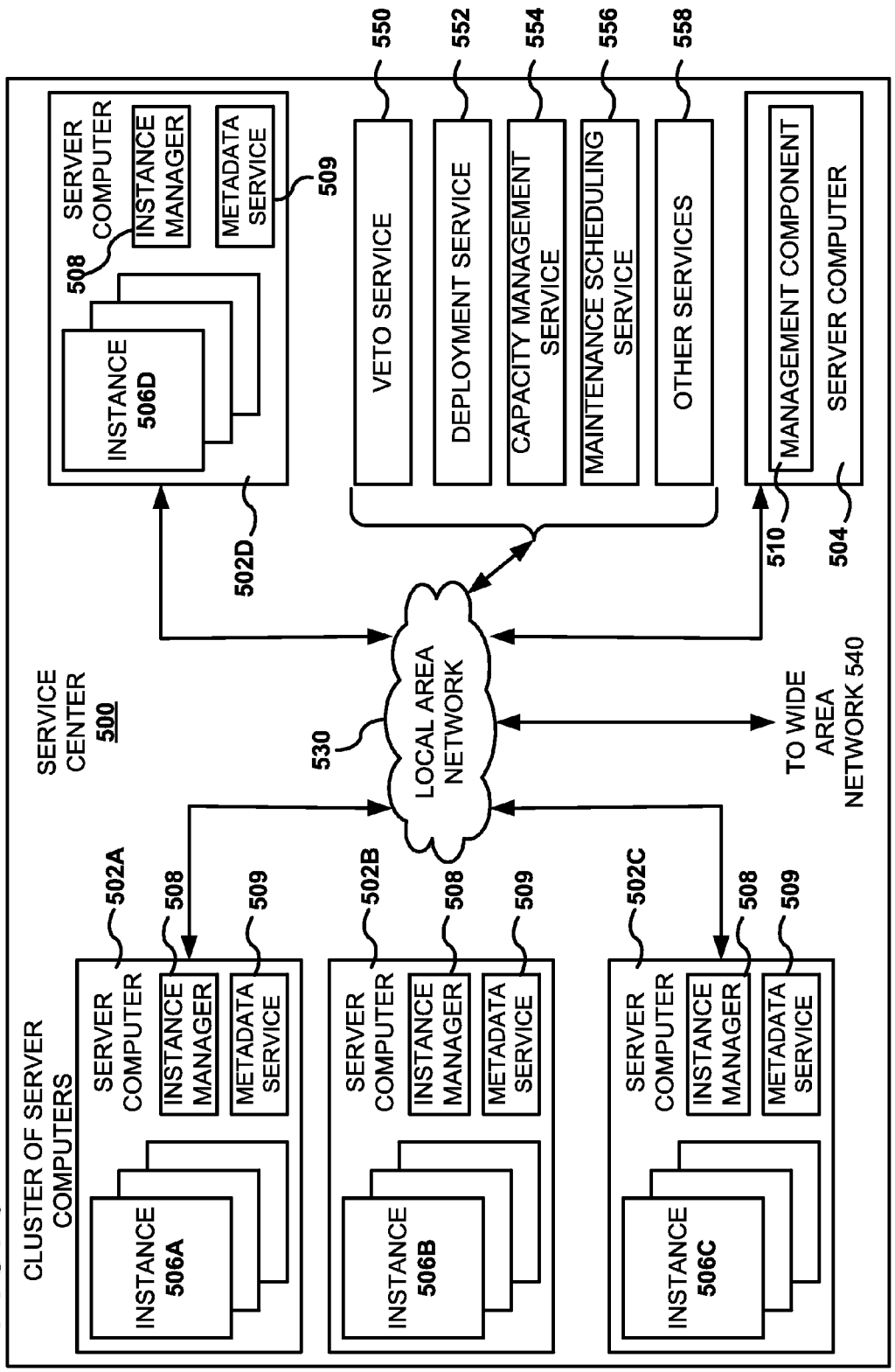
FIG. 5 is an example system diagram showing a plurality of server computers that can be used in conjunction with a veto service.

FIG. 5 is a computing system diagram of a network-based service center 500 that illustrates one configuration that can be used for the embodiments described herein. By way of background, the service center 500 is capable of delivery of computing and storage capacity as a service to a community of end recipients. Generally speaking, the service center 500 can provide the following models: infrastructure as a service, platform as a service, and/or software as a service. Other models can be provided. For the infrastructure as a service model, the service center 500 can offer computers as physical or virtual machines and other resources. The virtual machines can be run as guests by a hypervisor, as described further below. The platform as a service model delivers a computing platform can include an operating system, programming language execution environment, database, and web server. Application developers can develop and run their software solutions on the service center platform without the cost of buying and managing the underlying hardware and software. The software as a service model allows installation and operation of application software in the service center. In some embodiments, end users access the service center 500 using networked client devices, such as desktop computers, laptops, tablets, smartphones, etc. running web browsers or other lightweight client applications. Those skilled in the art will recognize that the service center 500 can be described as a "cloud" environment.

The particular illustrated service center 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machine instances. As known in the art, a virtual machine instance is an instance of a software implementation of a machine (i.e. a computer) that executes applications like a physical machine. In the example of virtual machine instances, each of the servers 502A-502D can be configured to execute an instance manager 508 capable of executing the instances. The instance manager 508 can be a hypervisor or another type of program configured to enable the execution of multiple instances 506 on a single server. Additionally, each of the instances 506 can be configured to execute one or more applications.

Each of the server computers 502 can have an associated metadata service 509. The metadata service 509 can obtain instance-specific metadata, such as an account identification, a unique identifier of the software application instance, a configuration of the software application instance, an instance type, MAC address, geographic region in which the software application instance is executing, etc. Any desired metadata attributes can be obtained to provide further information about the environment or configuration of the software application instance. Although shown locally on the server computers 502, the metadata service can be positioned on a separate server, such as server 504.

It should be appreciated that although the embodiments disclosed herein are described primarily in the context of virtual machine instances, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 504 can be reserved for executing software components for managing the operation of the server computers 502 and the instances 506. For example, the server computer 504 can execute a management component 510 (e.g., a management service). A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand.

The service center 500 can also include a veto service 550. The veto service can run on one or more of the systems of the service center 500 (e.g., as a distributed service). The veto service 550 can validate requests to change attributes of servers (e.g., servers 502A-502D) and/or to other computing resources of the service center 500. For example, the veto service 550 can provide a registration facility where services (e.g., services 552-558) can register to be notified of changes to attributes. When there is a pending change, the veto service 550 can notify registered services, determine responses for the notified services, apply filters, and/or consult internal rules, and decide whether to allow or deny the pending change.

The service center 500 includes a number of example services 552-558 that can utilize the veto service 550 and participate in validating requests to make changes to attributes of servers and/or other computing resources of the service center 500. The services include a deployment service 552 (e.g., for deploying software on server computers 502A-502D), a capacity management service 554 (e.g., for managing server capacity, such as an amount of available production capacity), a maintenance scheduling service 556 (e.g., for scheduling when a server should be taken down for maintenance), and other services 558 (e.g., a rebuild service, a testing service, an occupancy service, etc.). As a specific example, the maintenance scheduling service 556 can register with the veto service 550 to be notified when there is a pending change to any of the servers 502A-502D from a maintenance state to a production state. The maintenance scheduling service 556 can then veto a change from maintenance to production for a particular server if scheduled maintenance of that particular server is not yet complete.

A network 530 can be utilized to interconnect the server computers 502A-502D, the server computer 504, and the services 550-558 (e.g., running on one or more computing devices of the service center 500). The network 530 can be a local area network (LAN) and can be connected to a Wide Area Network (WAN) 540 so that end users can access the service center 500. It should be appreciated that the network topology illustrated in FIG. 5 has been simplified and that many more networks and networking devices can be utilized to interconnect the various computing systems disclosed herein.

Example Computing Systems

Figure 6:
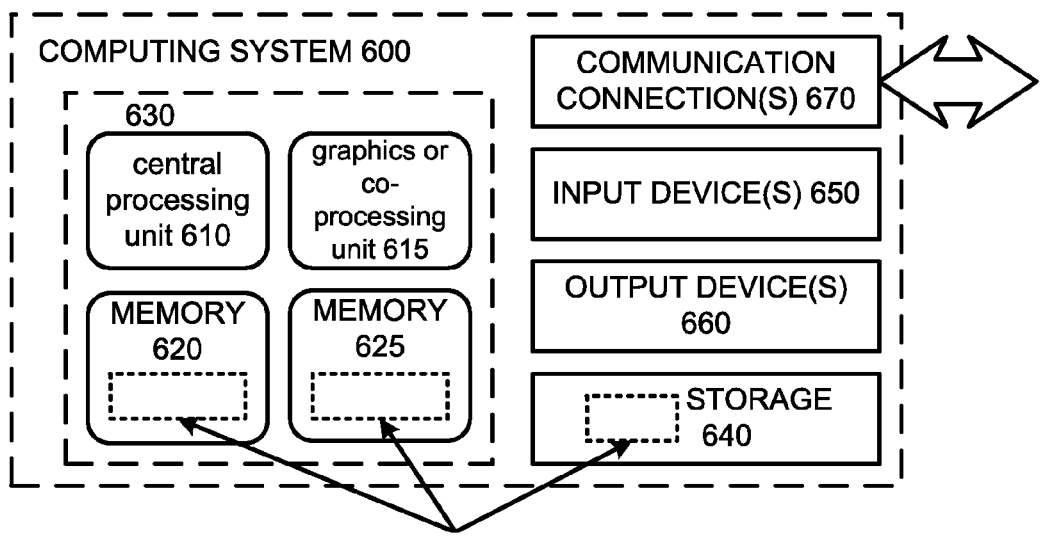
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include communication connections (e.g., 670) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a veto service running on one or more computing devices, for validating requests to change attributes of servers, the method comprising:
by the veto service running on the one or more computing devices:
receiving, from a plurality of services, requests to register for notification of changes to an attribute for a server, comprising:
requests to register for notification of transitions of the attribute from at least one specific state identified in the requests to at least one other specific state identified in the requests; and
a designation of a default response to use when the service is non-responsive, comprising:
an instruction to allow transitions of the attribute from a first operating state to a second operating state; and
an instruction to veto transitions of the attribute from the first operating state to a third operating state; and
upon determining a pending change to the attribute for the server:
sending a notification of the pending change to each service, of the plurality of services;
determining, for each service of the plurality of services, a response to the notification, wherein the response is one of an approval and a veto, and wherein the response is a default response when a service is non-responsive; and
based at least in part on the determined response for each service, deciding whether to allow or deny the pending change to the attribute for the server.

2. The method of claim 1 further comprising:
when the determined response from any service, of the plurality of services, is a veto, denying the pending change to the attribute for the server.

3. The method of claim 1 further comprising:
when the determined response from all services, of the plurality of services, is an approval, allowing the pending change for the attribute of the server.

4. The method of claim 1 further comprising:
evaluating, by the veto service, one or more internal rules;
wherein deciding whether to allow or deny the pending change to the attribute for the server is also based at least in part on results of evaluating the one or more internal rules.

5. The method of claim 1 wherein determining, for each service of the plurality of services, a response to the notification comprises:
for at least one service of the plurality of services, receiving the response from the at least one service; and for at least one other service of the plurality of services, determining a default response from the at least one other service.

6. The method of claim 1 wherein the attribute reflects an operating state of the server.

7. The method of claim 1 wherein the attribute is an operating state attribute indicating an operating state of the server, and wherein the pending change to the attribute is a transition from a production state to a maintenance state.

8. The method of claim 1 wherein the first operating state is a testing state, the second operating state is a rebuild state, and the third operating state is a production state.

9. A method, implemented at least in part by a veto service running on one or more computing devices, for validating requests to change attributes of servers, the method comprising:
by the veto service running on the one or more computing devices:
receiving, from each of a plurality of services:
a request to register for notification of a change to an attribute for one or more servers, comprising a request to register for notification of a transition of the attribute from at least one specific state identified in the request to at least one other specific state identified in the request; and
a designation of a default response to use when the service is non-responsive, wherein the designation of the default response to use when the service is non-responsive is selected from default response options comprising:
a default response to allow all requests to change the attribute; and
a default response to veto all requests to change the attribute;
sending a notification of a pending change to the attribute for the one or more servers to each of the plurality of services;
determining whether to allow or deny the pending change to the attribute based at least in part on received responses from responsive services and default responses from non-responsive services.

10. The method of claim 9 wherein determining whether to allow or deny the pending change to the attribute comprises:
when the received responses and default responses contain a veto from any of the plurality of services, denying the pending change to the attribute of the one or more servers.

11. The method of claim 9 wherein determining whether to allow or deny the pending change to the attribute comprises:
when the received responses and default responses from all of the plurality of services do not contain a veto, allowing the pending change to the attribute of the one or more servers.

12. The method of claim 9 wherein determining whether to allow or deny the pending change to the attribute is further based on evaluation of one or more internal rules of the veto service.

13. The method of claim 9 wherein default response options further comprise:
a default response that is a deferral to a response provided by a different service.

14. A computer environment for providing a veto service, the computer environment comprising:
one or more systems comprising processing units and memory;
the one or more systems configured to perform operations for validating requests to change attributes of computing resources, the operations comprising:
receiving, from a plurality of services, requests to register for notification of changes to an attribute for a computing resource, comprising:
requests to register for notification of transitions of the attribute from a first specific state identified in the requests to a second specific state identified in the requests; and
a designation of a default response to use when the service is non-responsive, comprising:
an instruction to allow transitions of the attribute from the first specific state to the second specific state; and
an instruction to veto transitions of the attribute from the first specific state to a third specific state; and
upon determining a pending change to the attribute for the computing resource, wherein the pending change is a transition of the attribute from the first specific state for the computing resource to the second specific state for the computing resource:
sending a notification of the pending change to each service, of the plurality of services;
determining, for each service of the plurality of services, a response to the notification, wherein the response is one of an approval and a veto, and wherein the response is a default response when a service is non-responsive; and
based at least in part on the determined response for each service, deciding whether to allow or deny the pending change to the attribute for the computing resource.

15. The computer environment of claim 14 the operations further comprising:
when the determined response from any service, of the plurality of services, is a veto, denying the pending change to the attribute of the computing resource.

16. The computer environment of claim 14 the operations further comprising:
when the determined response from all services, of the plurality of services, is an approval, allowing the pending change to the attribute of the computing resource.

17. The computer environment of claim 14 further comprising:
evaluating, by the veto service, one or more internal rules;
wherein deciding whether to allow or deny the pending change to the attribute for the computing resource is also based at least in part on results of evaluating the one or more internal rules.

18. The computer environment of claim 14 further comprising:
applying, by the veto service, a filter to the determined responses to the notification to generate filtered responses, wherein deciding whether to allow or deny the pending change to the attribute for the computing resource is also based at least in part on the filtered responses.

19. The computer environment of claim 18 wherein applying the filter comprises:
for a first category of the plurality of services, including the determined responses for the first category in the filtered responses;
for a second category of the plurality of services, including a veto from the second category in the filtered responses only when a threshold number of vetoes are present in the determined responses for the second category.

20. The computer environment of claim 14 wherein determining, for each service of the plurality of services, a response to the notification comprises:
   for at least one service of the plurality of services, receiving the response from the at least one service; and
   for at least one other service of the plurality of services, determining a default response from the at least one other service.

21. The computer environment of claim 14 wherein the first specific state is a testing state, the second specific state is a rebuild state, and the third specific state is a production state.

22. The computer environment of claim 18 wherein applying the filter comprises:
   obtaining a capacity threshold;
   denying the pending change when the pending change would reduce capacity below the capacity threshold.

* * * * *